United States Patent
Gao et al.

(10) Patent No.: US 11,943,084 B2
(45) Date of Patent: Mar. 26, 2024

(54) SIGNAL PROCESSING METHOD AND RELATED APPARATUS

(71) Applicant: HUAWEI TECHNOLOGIES CO., LTD., Shenzhen (CN)

(72) Inventors: Kuandong Gao, Chengdu (CN); Mao Yan, Chengdu (CN); Huang Huang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/863,981

(22) Filed: Jul. 13, 2022

(65) Prior Publication Data

US 2022/0360479 A1 Nov. 10, 2022

Related U.S. Application Data

(63) Continuation of application No. PCT/CN2020/072658, filed on Jan. 17, 2020.

(51) Int. Cl.
 *H04L 27/04* (2006.01)
 *H04L 25/03* (2006.01)
 *H04L 27/08* (2006.01)

(52) U.S. Cl.
 CPC ........ *H04L 27/04* (2013.01); *H04L 25/03866* (2013.01); *H04L 27/08* (2013.01)

(58) Field of Classification Search
 CPC .... H04L 27/04; H04L 25/03866; H04L 27/08
 See application file for complete search history.

(56) References Cited

U.S. PATENT DOCUMENTS

| | | | | |
|---|---|---|---|---|
| 5,007,088 | A | * | 4/1991 | Ooi ............... H04L 25/03866 380/46 |
| 5,623,485 | A | * | 4/1997 | Bi ..................... H04J 13/0022 375/152 |
| 6,072,340 | A | * | 6/2000 | Deisch ................ H03M 1/822 327/344 |
| 9,294,941 | B1 | * | 3/2016 | Wu ...................... H04W 24/02 |
| 2008/0080598 | A1 | * | 4/2008 | Mo ..................... H04L 27/2601 375/219 |
| 2011/0028103 | A1 | | 2/2011 | Rofougaran |
| 2015/0156037 | A1 | * | 6/2015 | Sahlin ................. H04L 25/023 375/349 |

(Continued)

FOREIGN PATENT DOCUMENTS

| | | |
|---|---|---|
| CN | 106254298 A | 12/2016 |
| CN | 108696936 A | 10/2018 |

(Continued)

OTHER PUBLICATIONS

International Search Report issued in corresponding International Application No. PCT/CN2020/072658, dated Oct. 22, 2020, pp. 1-8.

(Continued)

*Primary Examiner* — Vineeta S Panwalkar
(74) *Attorney, Agent, or Firm* — HAUPTMAN HAM, LLP

(57) ABSTRACT

A method includes generating a data signal based on data, scrambling the data signal with a pseudo-random signal thereby generating a scrambled data signal, generating an amplitude shift keying (ASK) signal based on the scrambled data signal, and transmitting, by a transceiver, the ASK signal.

17 Claims, 5 Drawing Sheets

(56) References Cited

U.S. PATENT DOCUMENTS

2016/0080842 A1\* 3/2016 Ma .......................... H04L 7/041
                                                            398/45

FOREIGN PATENT DOCUMENTS

| EP | 3576478 A1 | 12/2019 |
| JP | H11298540 A | 10/1999 |
| JP | 2004112464 A | 4/2004 |
| JP | 2012054837 A | 3/2012 |
| JP | 2018513488 A | 5/2018 |
| WO | 2005081420 A1 | 9/2005 |
| WO | 2007072563 A1 | 6/2007 |
| WO | 2015114836 A1 | 8/2015 |
| WO | 2019184963 A1 | 10/2019 |

OTHER PUBLICATIONS

Extended European Search Report issued in corresponding European Application No. 20913193.7, dated Nov. 11, 2022, pp. 1-7.
Xiaofei Wang (InterDigital), On the Coexistence of 802.11ax and 802.11ba Signals, IEEE 802.11-17/0659r3, IEEE, May 8, 2017, total 22 pages.
Japanese Office Action issued in corresponding Japanese Application No. 2023-543378, dated Sep. 5, 2023, pp. 1-7.
Japanese Office Action issued in corresponding Japanese Patent Application No. 2023-543378, mailed Jan. 30, 2024, pp. 1-9.

\* cited by examiner

SIGNAL PROCESSING METHOD AND RELATED APPARATUS

CROSS-REFERENCE TO RELATED APPLICATIONS

This application is a continuation of International Application No. PCT/CN2020/072658, filed on Jan. 17, 2020, the disclosure of which is hereby incorporated by reference in its entirety.

TECHNICAL FIELD

This application relates to the communication field, and in particular, to a signal processing method and a related apparatus.

BACKGROUND

Backscatter communication (backscatter communication) is a passive communication technology. During backscatter communication, an electronic tag is read and written in a radio frequency manner. Because a dedicated radio frequency excitation source and an additional spectrum resource are not required during backscatter communication, backscatter communication has advantages such as low power consumption and low costs, and has a good prospect of being applied to the internet of things.

In some approaches a radio signal used during backscatter communication is an amplitude shift keying (ASK) signal. ASK signal is a square wave signal having narrow bandwidth, and energy of the ASK signal is concentrated at a center location in a frequency band of the ASK signal. Consequently, the ASK signal causes great interference to another communication device in a cellular communication system.

SUMMARY

In view of this, one or more embodiments of this application provide a signal processing method applied to a cellular communication system, to disperse energy of an ASK signal in a frequency band and reduce interference to the cellular system.

According to a first aspect, a signal processing method applied to a cellular communication system is provided. The method includes: generating a data signal based on original data; scrambling the data signal by using a pseudo-random signal; generating an ASK signal based on the scrambled data signal; and sending the ASK signal to a backscatter device. The original data may be a radio-frequency identification or sensor information.

According to some embodiments, the ASK signal can be adjusted from a square wave signal to a non-square wave signal. In this way, energy of the ASK signal can be dispersed in a frequency band of the ASK signal, so that an interference distance can be reduced. In addition, a random signal can be generated by scrambling the data signal by using the pseudo-random signal, so that interference to another communication device in the cellular communication system can be reduced.

In some embodiments, the generating a data signal based on original data includes: repeating the original data to obtain the data signal.

In some embodiments, the generating a data signal based on original data includes: performing repeated sampling on the original data to obtain the data signal.

In some embodiments, the scrambling the data signal by using a pseudo-random signal includes: performing an exclusive OR operation on the pseudo-random signal and the data signal. Therefore, a method for scrambling the data signal is provided.

In some embodiments, the scrambling the data signal by using a pseudo-random signal includes: performing a multiplication operation on the pseudo-random signal and the data signal. Therefore, another method for scrambling the data signal is provided.

In some embodiments, the generating an ASK signal based on the scrambled data signal includes: performing time-frequency transformation on the scrambled data signal; filtering a frequency domain signal obtained through time-frequency transformation; mapping the filtered frequency domain signal to a carrier; performing frequency-time transformation on a carrier signal obtained through mapping; and filtering the frequency-time transformed carrier signal to obtain the ASK signal. According to this implementation, a noise component of the ASK signal is reduced by using the filtering method, so that quality of the ASK signal can be improved.

In some embodiments, the generating an ASK signal based on the scrambled data signal includes: filtering the scrambled data signal to obtain the ASK signal. According to this implementation, a noise component of the ASK signal is reduced by using the another filtering method, so that quality of the ASK signal can be improved.

In some embodiments, the pseudo-random signal includes at least one of a ZC sequence, a BPSK signal sequence, a $\pi/2$-BPSK signal sequence, a gold sequence, or an m-sequence.

According to a second aspect, a terminal is provided. The terminal has a function of implementing the signal processing method according to any implementation of the first aspect. The function may be implemented by hardware, or may be implemented by hardware executing corresponding software. The hardware or software includes one or more modules corresponding to the foregoing function.

According to a third aspect, a computer-readable storage medium is provided. The computer-readable storage medium stores instructions. When the instructions are run on a computer, the computer is enabled to perform the method according to the foregoing aspect.

According to a fourth aspect, a computer program product including instructions is provided. When the computer program product runs on a computer, the computer is enabled to perform the method according to the foregoing aspect.

DESCRIPTION OF EMBODIMENTS

A signal processing method in this application may be applied to a backscatter communication system.

Figure 1:
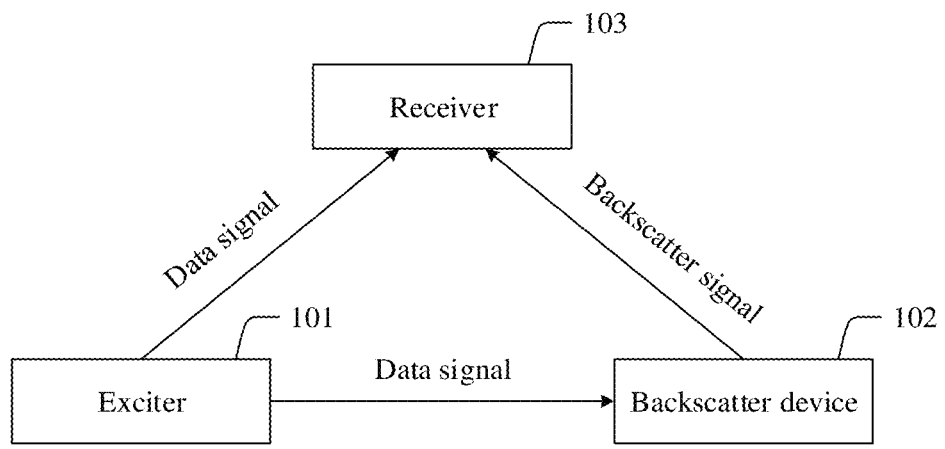
FIG. 1 is a schematic diagram of a backscatter communication system according to one or more embodiments of this application.

Refer to FIG. 1. In a backscatter communication system, the backscatter communication system includes an exciter 101, a backscatter device 102, and a receiver 103.

The exciter 101 may also be referred to as a helper (helper), an interrogator (interrogator), or a reader (reader). The exciter 101 may be a module in a network device or a module in a terminal.

The backscatter device 102 is a radio-frequency tag. The radio-frequency tag may be an active tag, a passive tag, or a semi-active tag. The backscatter device may also be referred to as a backscatter device or a radio frequency identification device. The backscatter device 102 may include a data receiving unit and a data detection unit.

The receiver 103 is an apparatus configured to receive a radio signal. The receiver 103 may be specifically a radio signal receiving module in the network device or a radio signal receiving module in the terminal.

The exciter 101 may transmit a radio frequency signal. After receiving the radio frequency signal, the backscatter device 102 includes data in the radio frequency signal to obtain a backscatter signal, and then transmits the backscatter signal. The receiver 103 may separately receive the radio frequency signal transmitted by the exciter 101 and the backscatter signal transmitted by the backscatter device 102. The receiver 103 demodulates the backscatter signal to obtain the data sent by the backscatter device 102. The data may be a radio-frequency identification (RFID). When a sensor is integrated in the backscatter device 102 or the backscatter device 102 is connected to a sensor, the data may alternatively be data collected by the sensor, for example, humidity data collected by a humidity sensor or temperature data collected by a temperature sensor. The sensor and the data collected by the sensor are not limited to the foregoing examples.

Figure 2:
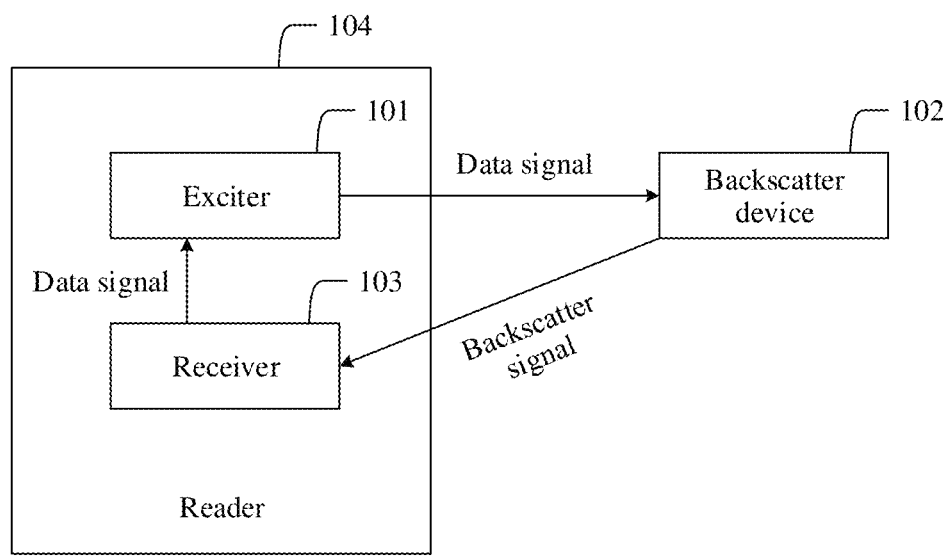
FIG. 2 is another schematic diagram of a backscatter communication system according to one or more embodiments of this application.

Refer to FIG. 2. In another backscatter communication system, an exciter 101 and a backscatter device 102 are integrated in a reader 104.

In the backscatter communication system, a communication link on which the exciter 101 transmits a signal to the backscatter device 102 is referred to as a forward communication link, and the signal used by the forward communication link is referred to as a forward communication signal. The forward communication signal may not only carry data, but also charge the backscatter device 102.

The forward communication signal is usually an ASK signal, and the ASK signal is a square wave signal. In some ASK signals, high level indicates 1 and low level indicates 0; or high level indicates 0 and low level indicates 1. In an ASK signal encoded by using Manchester code, jumping from high level to low level indicates 1, and jumping from low level to high level indicates 0. When a digital signal is transmitted by using the ASK signal, the digital signal 0 or 1 is transmitted by using a square wave. Consequently, the ASK signal has narrow bandwidth, and energy of the signal is concentrated in a center of a frequency band of the ASK signal, resulting in great interference to a cellular communication system.

Figure 3:
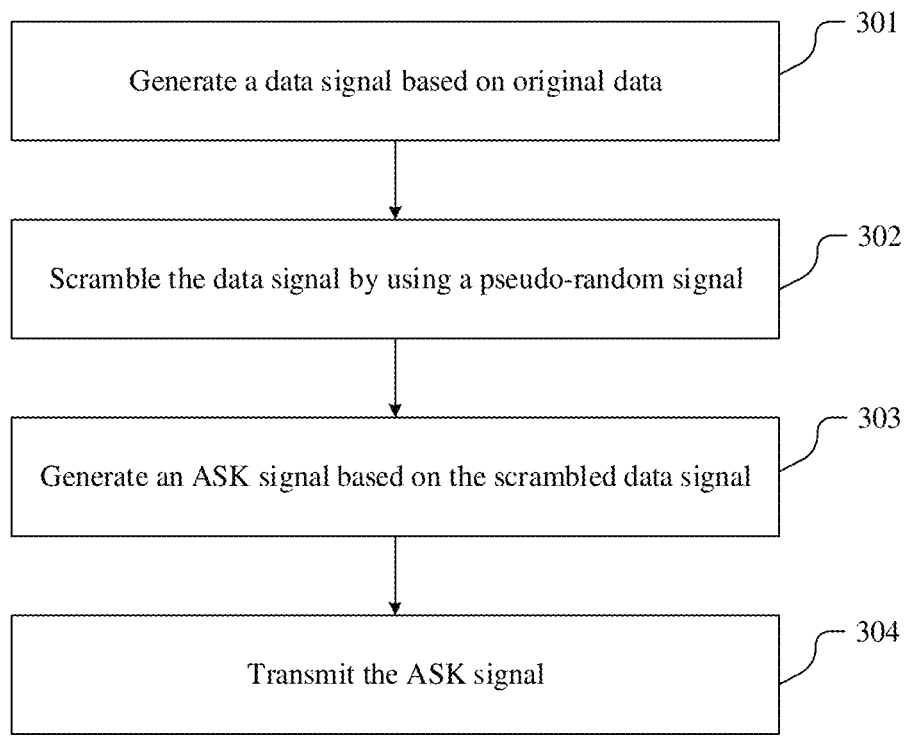
FIG. 3 is a schematic flowchart of a signal processing method according to one or more embodiments of this application.

To resolve the foregoing problem, this application provides a signal processing method applied to the cellular communication system, to disperse the energy of the ASK signal in the frequency band of the signal, so that interference to another communication device is reduced. For details, refer to the following embodiment. Refer to FIG. 3. An embodiment of the signal processing method in this application includes the following steps.

Step 301: Generate a data signal based on original data.

Step 302: Scramble the data signal by using a pseudo-random signal.

The pseudo-random signal is also referred to as a pseudo-random sequence or pseudo-random code. The pseudo-random signal includes at least one of a ZC sequence, a gold sequence, an m-sequence, a binary phase shift keying (BPSK) signal sequence, or a $$\frac{\pi}{2} - BPSK$$

signal sequence. Elements in the BPSK signal sequence may be randomly arranged or fixedly arranged, and may be a BPSK signal sequence obtained based on a gold sequence. Alternatively, elements in the $$\frac{\pi}{2} - BPSK$$

signal sequence may be randomly arranged or fixedly arranged, and may be but are not limited to a $$\frac{\pi}{2} - BPSK$$

signal sequence obtained based on a gold sequence.

The pseudo-random signal may be any one of the foregoing sequences, or a combination sequence including two sequences. The combination sequence may be a combination of a ZC sequence and a random BPSK signal sequence, a combination of a ZC sequence and a random $$\frac{\pi}{2} - BPSK$$

signal sequence, a combination of a ZC sequence and a BPSK signal sequence that is obtained based on a gold sequence, or a combination of a ZC sequence and a $$\frac{\pi}{2} - BPSK$$

signal sequence that is obtained based on a gold sequence.

The following describes in detail the sequences in this application.

1. The ZC sequence is also referred to as a Zadoff-Chu sequence.

An $m^{th}$ element seq(m) in the ZC sequence is $$seq(m) = \exp\left(\frac{-j * \pi * m * (m-1) * R}{N}\right),$$

where m is any positive integer in [0, N−1]; N is a sequence length, namely, a total quantity of elements included in the ZC sequence; j is an imaginary number; and R is a sequence reference value.

2. The gold sequence is a pseudo-random sequence generated based on two m-sequences.

3. The m-sequence is a pseudo-random sequence including a preset multinomial.

4. The BPSK signal sequence may be a sequence including 1 and −1, or may be a sequence including j and −j. When an element in the sequence is 1, a phase is 0; or when an element is −1, a phase is π.

5. The $$\frac{\pi}{2} - BPSK$$

signal sequence is obtained by further performing phase modulation on two adjacent BPSK signal sequences. The adjacent BPSK signal sequences may be denoted as $q_1$ and $$q_2 * \exp\left(\frac{\pi}{2}\right),$$

where $$\exp\left(\frac{\pi}{2}\right)$$

indicates that a phase is increased by $$\frac{\pi}{2}.$$

In some embodiments, step 302 includes: performing an exclusive OR operation on the pseudo-random signal and the data signal, and using a result of the exclusive OR operation as the scrambled data signal. In some embodiments, step 302 alternatively includes: performing a multiplication operation on the pseudo-random signal and the data signal, and using a result of the multiplication operation as the scrambled data signal. The scrambled data signal may alternatively be an operation result obtained by performing, on the pseudo-random signal and the data signal, an operation other than the exclusive OR operation and the multiplication operation.

Step 303: Generate an ASK signal based on the scrambled data signal.

Step 304: Transmit the ASK signal.

In this embodiment, when the data signal is scrambled by using the pseudo-random signal, energy of the ASK signal can be dispersed in a frequency band of the ASK signal, so that a distance of interference of the ASK signal to another signal can be reduced.

In addition, when the data signal is scrambled by using the pseudo-random signal, the data signal can be converted into a random signal, so that interference to another communication device can be reduced.

In the foregoing embodiment, a method for scrambling the data signal is described. In this application, the data signal may be scrambled. In addition, after the data is repeated, the repeated data may be scrambled by using the pseudo-random signal. Similar to scrambling the data signal, after the repeated data is scrambled, the repeated data may be converted into a random signal, so that the interference of the ASK signal to another communication device can be reduced.

In some embodiments, before step 301, the signal processing method further includes: sending an excitation signal to a backscatter device; receiving a backscatter signal sent by the backscatter device; and demodulating the backscatter signal to obtain the original data. The backscatter signal is generated by the backscatter device in response to the excitation signal.

In some embodiments, step 303 includes: performing time-frequency transformation on the scrambled data signal; filtering a frequency domain signal obtained through time-frequency transformation; mapping the filtered frequency domain signal to a carrier; performing frequency-time transformation on a carrier signal obtained through mapping; and filtering the frequency-time transformed carrier signal to obtain the ASK signal.

In this embodiment, time-frequency transformation is performed on the scrambled data signal. Then, frequency-domain filtering is performed on the frequency domain signal. Then, the filtered frequency domain signal is mapped, and frequency-time transformation and time-domain filtering are performed. In this way, a method for generating the ASK signal based on the scrambled signal is provided.

In some embodiments, step 303 includes: filtering the scrambled data signal to obtain the ASK signal. The ASK signal may also be generated by performing time-domain filtering on the scrambled data signal. In this way, another method for generating the ASK signal based on the scrambled signal is provided.

Figure 4:
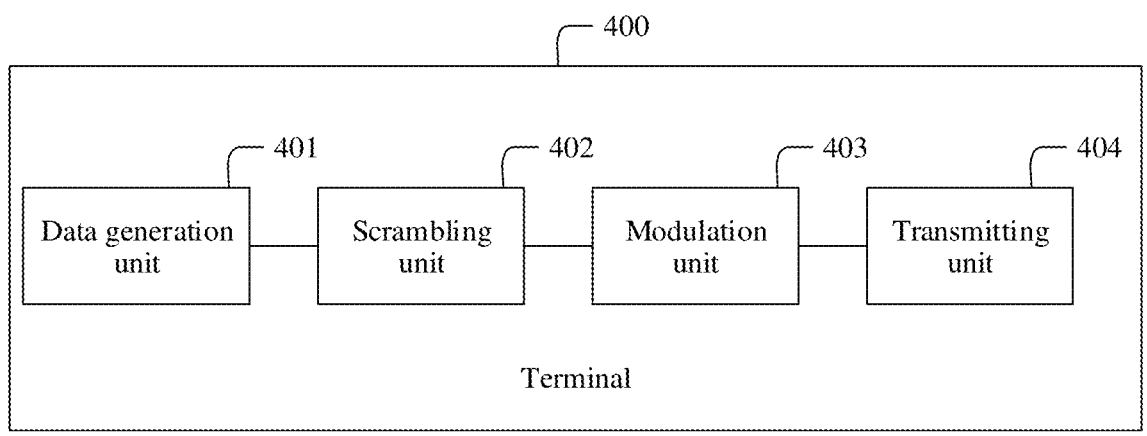
FIG. 4 is a schematic diagram of a structure of a terminal according to one or more embodiments of this application.

The foregoing describes the signal processing method in this application, and the following describes an apparatus in this application. This application provides a terminal that can implement the signal processing method in the foregoing embodiment. Refer to FIG. 4. In an embodiment, a terminal 400 includes:

a data generation unit 401, configured to generate a data signal based on original data, where the data signal may be downlink control information on a physical downlink control channel, data information on a physical downlink shared channel, or another data signal, which is not limited in this application;

a scrambling unit 402, configured to scramble the data signal by using a pseudo-random signal;

a modulation unit 403, configured to generate an ASK signal based on the scrambled data signal; and a transmitting unit 404, configured to transmit the ASK signal.

In some embodiments, the data generation unit 401 is specifically configured to repeat the original data to obtain the data signal.

In some embodiments, the data generation unit 401 is specifically configured to perform repeated sampling on the original data to obtain the data signal.

In some embodiments, the scrambling unit 402 is specifically configured to perform an exclusive OR operation on the pseudo-random signal and the data signal.

In some embodiments, the scrambling unit 402 is specifically configured to perform a multiplication operation on the pseudo-random signal and the data signal.

Figure 5:
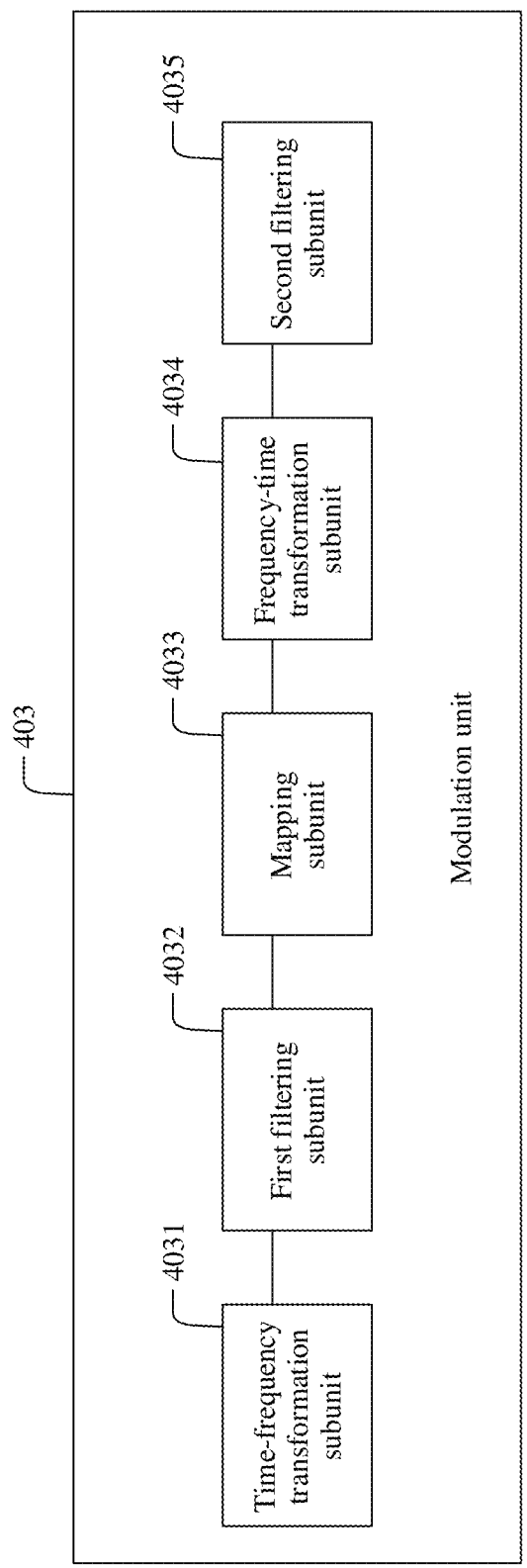
FIG. 5 is a schematic diagram of a structure of a modulation unit according to one or more embodiments of this application.

Refer to FIG. 5. In some embodiments, the modulation unit 403 includes:
- a time-frequency transformation subunit 4031, configured to perform time-frequency transformation on the scrambled data signal;
- a first filtering subunit 4032, configured to filter a frequency domain signal obtained through time-frequency transformation;
- a mapping subunit 4033, configured to map the filtered frequency domain signal to a carrier;
- a frequency-time transformation subunit 4034, configured to perform frequency-time transformation on a carrier signal obtained through mapping; and
- a second filtering subunit 4035, configured to filter the frequency-time transformed carrier signal to obtain the ASK signal.

In some embodiments, the modulation unit 403 is specifically configured to filter the scrambled data signal to obtain the ASK signal.

In the foregoing embodiments, the pseudo-random signal includes at least one of a ZC sequence, a BPSK signal sequence, a π/2-BPSK signal sequence, a gold sequence, or an m-sequence.

Figure 6:
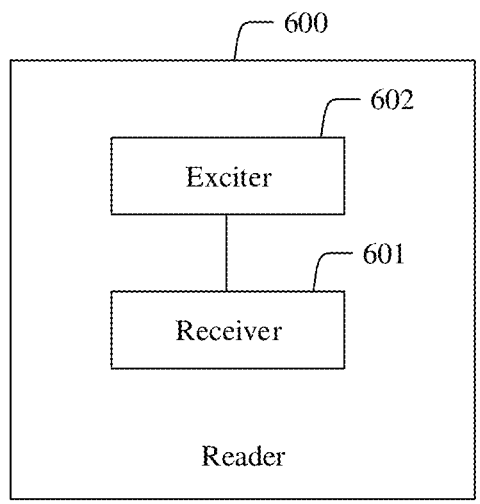
FIG. 6 is a schematic diagram of a structure of a reader according to one or more embodiments of this application.

Refer to FIG. 6. In some embodiments, a reader 600 in this application includes a receiver 601 and an exciter 602 that are connected to each other. The exciter 602 can implement the signal processing method in the embodiment shown in FIG. 3.

Figure 7:
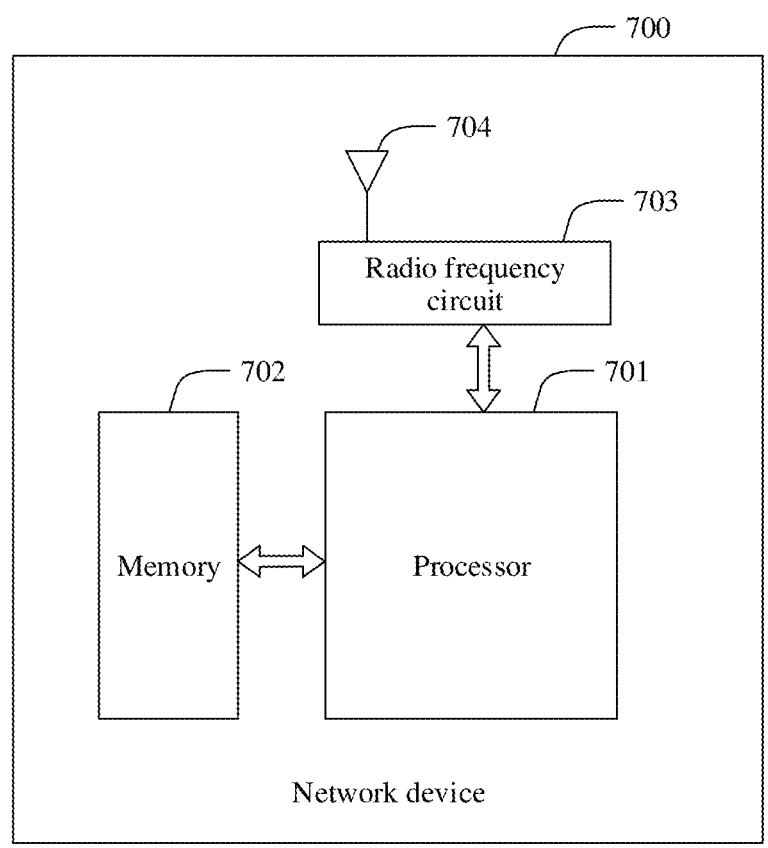
FIG. 7 is a schematic diagram of a structure of a network device according to one or more embodiments of this application.

Refer to FIG. 7. In some embodiments, a network device 700 in this application includes:
- a processor 701, a memory 702, a radio frequency circuit 703, and an antenna 704, where the processor 701 is connected to each of the memory 702 and the radio frequency circuit 703, and the radio frequency circuit 703 is connected to the antenna 704.

The processor 701 is configured to implement a function of controlling and managing resources in the network device 700. For example, the processor 701 may include a digital signal processor device, a microprocessor device, an analog-to-digital converter, and a digital-to-analog converter. Control and signal processing functions of the network device 700 may be allocated between these devices based on capabilities of these devices.

The memory 702 is mainly configured to store a software program and data. The radio frequency circuit 703 is configured to: perform conversion between a baseband signal and a radio frequency signal, and process the radio frequency signal. The antenna 704 is mainly configured to send and receive a radio frequency signal in a form of an electromagnetic wave.

In this embodiment of this application, the antenna 704 and the radio frequency circuit 703 that have receiving and sending functions may be considered as a transceiver unit of the network device 700. The transceiver unit may also be referred to as a transceiver, a transceiver circuit, a transceiver apparatus, or the like. In some embodiments, a component that is in the transceiver unit and that is configured to implement a receiving function may be considered as a receiving unit, and a component that is in the transceiver unit and that is configured to implement a sending function may be considered as a sending unit. In other words, the transceiver unit includes the receiving unit and the sending unit. Specifically, under control of the processor 701, the receiving unit may receive a backscatter signal from a backscatter device. Alternatively, the receiving unit receives a radio signal sent by a terminal or another network device.

It should be understood that the processor 701 is configured to perform step 301 to step 303 in the embodiment shown in FIG. 3, and the sending unit may implement step 304 in the foregoing embodiment under the control of the processor 701.

There may be one or more processors 701, one or more memories 702, one or more radio frequency circuits 703, and one or more antennas 704. Although not shown in FIG. 7, the network device 700 may further include a clock synchronization module, a power module, and the like.

The network device 700 may be a base station, a relay station, an access point, or a base transceiver station (BTS). Alternatively, the network device may be a global system for mobile communications (GSM) base station, a code division multiple access (CDMA) base station, a wideband code division multiple access (WCDMA) base station, a long term evolution (LTE) base station, a wireless controller in a cloud radio access network (CRAN), a 5G base station, or a network device in a future evolved communication system (for example, a future public land mobile network (PLMN)). The WCDMA base station is also referred to as a NodeB or an NB. The LTE base station is also referred to as an eNB or an eNodeB. Alternatively, the network device 700 may be a wearable device or a vehicle-mounted device.

Figure 8:
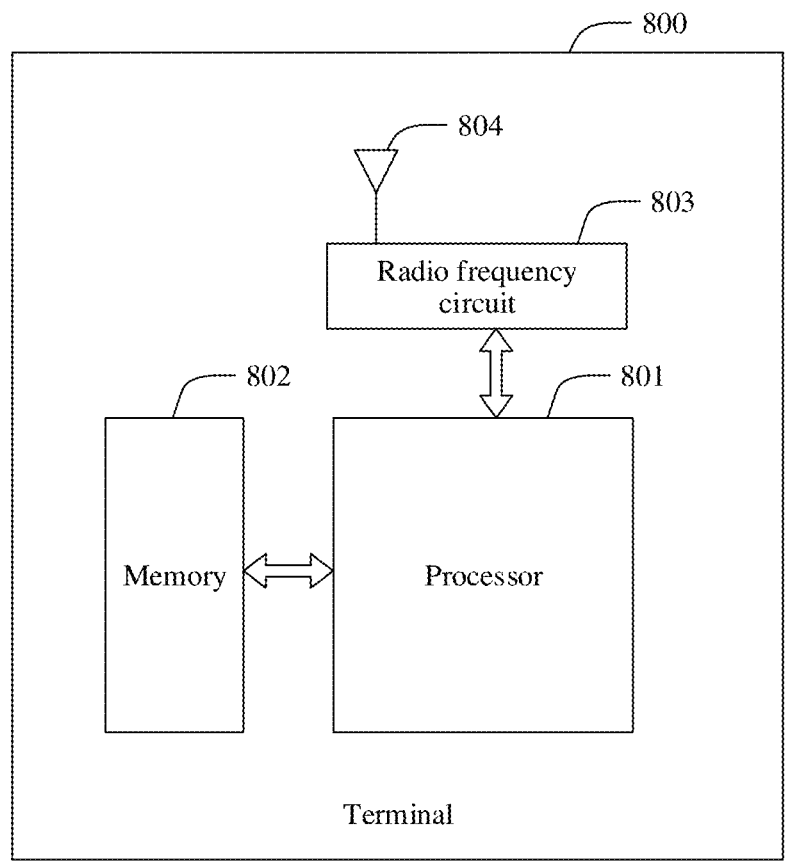
FIG. 8 is a schematic diagram of another structure of a terminal according to one or more embodiments of this application.

Refer to FIG. 8. In another embodiment, a terminal 800 in this application includes:
- a processor 801, a memory 802, a radio frequency circuit 803, and an antenna 804, where the processor 801 is connected to each of the memory 802 and the radio frequency circuit 803, and the radio frequency circuit 803 is connected to the antenna 804.

The processor 801 may include circuits used for audio/video and logical functions of the terminal. For example, the processor 801 may include a digital signal processor device, a microprocessor device, an analog-to-digital converter, and a digital-to-analog converter. Control and signal processing functions of the terminal 800 may be allocated between these devices based on capabilities of these devices. The processor 801 may further include an internal voice coder, an internal data modem, and the like. In addition, the processor 801 may include functions for operating one or more software programs, and the software programs may be stored in the memory 802. Usually, the processor 801 and stored software instructions may be configured to enable the terminal 800 to perform an action.

The memory 802 may include a memory that can store an information element related to a mobile user, for example, a subscriber identity module (SIM). In addition to the SIM, the memory 802 may further include another removable and/or fixed memory. The memory 802 may include a transitory memory and/or a non-transitory memory. For example, the transitory memory may include a random access memory (RAM), and the RAM includes a dynamic RAM and/or a static RAM, and an on-chip and/or off-chip cache. The non-transitory memory may be embedded and/or removable. The non-transitory memory may include, for example, a read-only memory, a flash memory, a magnetic storage device such as a hard disk, a floppy disk drive, or a magnetic tape, an optical disc drive and/or a medium, and a non-transitory random access memory. Similar to the transitory memory, the non-transitory memory may include a cache area used for temporary storage of data. At least a part of the transitory memory and/or the non-transitory memory may be embedded into the processor. The memory 802 may store one or more software programs, instructions, information blocks, pieces of data, and the like that can be executed by the processor 801. For example, the memory 802 may include an identifier that can uniquely identify the terminal, for example, international mobile equipment identity code.

The terminal may further include one or more connection circuit modules configured to share and/or obtain data. For example, the terminal may include a short-range radio frequency transceiver and/or detector, to share data with and/or obtain data from an electronic device based on an RF technology.

The radio frequency circuit 803 is configured to: perform conversion between a baseband signal and a radio frequency signal, and process the radio frequency signal. The antenna 804 is mainly configured to send and receive a radio frequency signal in a form of an electromagnetic wave. In this embodiment of this application, the antenna 804 and the radio frequency circuit 803 that have receiving and sending functions may be considered as a transceiver unit of the terminal device 800. The transceiver unit may also be referred to as a transceiver, a transceiver circuit, a transceiver apparatus, or the like. In some embodiments, a component that is in the transceiver unit and that is configured to implement a receiving function may be considered as a receiving unit, and a component that is in the transceiver unit and that is configured to implement a sending function may be considered as a sending unit. In other words, the transceiver unit includes the receiving unit and the sending unit. Specifically, under control of the processor 801, the receiving unit may receive a backscatter signal from a backscatter device. Alternatively, the receiving unit receives a radio signal sent by the terminal or another network device.

It should be understood that the processor 801 is configured to perform step 301 to step 303 in the embodiment shown in FIG. 3, and a transmitting unit may implement step 304 in the foregoing embodiment under the control of the processor 801.

There may be one or more processors 801, one or more memories 802, one or more radio frequency circuits 803, and one or more antennas 804. The terminal 800 may include other short-range transceivers such as an infrared transceiver, a used transceiver, and a wireless universal serial bus transceiver. A Bluetooth transceiver can perform an operation based on a low-power or ultra-low-power Bluetooth technology. In this case, the terminal, more specifically, the short-range transceiver can send data to and/or receive data from an electronic device near the apparatus (for example, within 10 meters). Although not shown in FIG. 8, the terminal can send data to and/or receive data from the electronic device based on various wireless networking technologies. These technologies include: Wi-Fi, Wi-Fi low power consumption, and wireless local area network (WLAN) technologies such as an IEEE 802.11 technology, an IEEE 802.15 technology, and an IEEE 802.16 technology.

The terminal 800 may further include a user interface. The user interface may include a headset or loudspeaker, a microphone, an output apparatus (for example, a display), an input apparatus, and the like. The user interface may be coupled to the processor through an operation. In this case, the processor 801 may include a user interface circuit, configured to control at least some functions of one or more elements (for example, the loudspeaker, the microphone, and the display) of the user interface. The processor 801 and/or the user interface circuit included in the processor 801 may be configured to control one or more functions of the one or more elements of the user interface by using computer program instructions (for example, software and/or firmware) stored in a memory accessible by the processor. Although not shown in FIG. 8, the terminal 800 may include a battery configured to supply power to various circuits related to mobile equipment. The circuit is, for example, a circuit that provides mechanical vibration as detectable output. The input apparatus may include a device that allows the apparatus to receive data, for example, a keypad, a touch display, a joystick, and/or at least one other input device.

The terminal 800 may be user equipment (UE), an access terminal, a user equipment unit, a subscriber station, a mobile station, a remote station, a remote terminal, a mobile device, a terminal device, a wireless communication device, a user equipment agent, a user equipment apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved PLMN, or the like.

Figure 9:
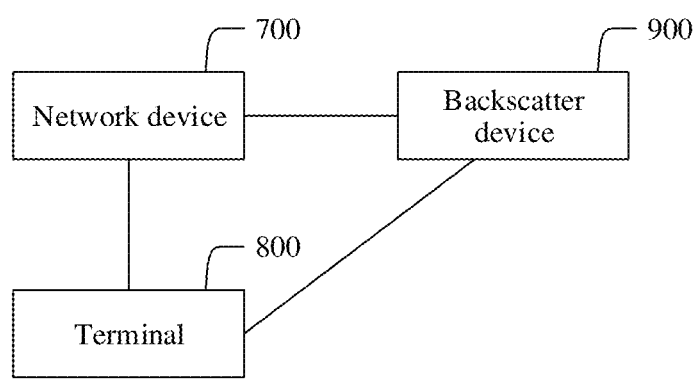
FIG. 9 is a schematic diagram of a structure of a cellular communication system according to one or more embodiments of this application.

Refer to FIG. 9. In an embodiment, a cellular communication system in this application includes:

a backscatter device 900, a network device 700, and a terminal 800.

The network device 700 may transmit an ASK signal to the backscatter device 900. The backscatter device may transmit a backscatter signal to the network device 700 based on the ASK signal.

The terminal 800 may transmit an ASK signal to the backscatter device 900. The backscatter device may transmit a backscatter signal to the terminal 800 based on the ASK signal.

The network device 700 and the terminal 800 may perform bidirectional communication through a radio link.

This application provides a computer-readable storage medium. The computer-readable storage medium includes instructions. When the instructions are run on a computer, the computer is enabled to perform the method described in any one of the foregoing embodiments.

All or some of the foregoing embodiments may be implemented by using software, hardware, firmware, or any combination thereof. When software is used for implementation, all or some of embodiments may be implemented in a form of a computer program product.

The computer program product includes one or more computer instructions. When the computer program instructions are loaded and executed on a computer, all or some of the procedures or the functions according to embodiments of the present application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

What is claimed is:

1. A method, comprising:
generating a data signal based on data;
scrambling the data signal with a pseudo-random signal thereby generating a scrambled data signal;
generating an amplitude shift keying (ASK) signal based on the scrambled data signal; and
transmitting the ASK signal, wherein the generating the ASK signal based on the scrambled data signal comprises:
performing a time-frequency transformation on the scrambled data signal thereby generating a frequency domain signal;
filtering the frequency domain signal thereby generating a filtered frequency domain signal;
mapping the filtered frequency domain signal to a carrier signal;
performing a frequency-time transformation on the carrier signal thereby generating a frequency-time transformed carrier signal; and
filtering the frequency-time transformed carrier signal thereby generating the ASK signal.

2. The method according to claim 1, wherein the generating the data signal based on the data comprises:
repeating the data thereby generating the data signal.

3. The method according to claim 1, wherein the scrambling the data signal with the pseudo-random signal thereby generating the scrambled data signal comprises:
performing an exclusive OR operation on the pseudo-random signal and the data signal.

4. The method according to claim 1, wherein the scrambling the data signal by with the pseudo-random signal thereby generating the scrambled data signal comprises:
performing a multiplication operation on the pseudo-random signal and the data signal.

5. The method according to claim 1, wherein the generating the ASK signal based on the scrambled data signal comprises:
filtering the scrambled data signal thereby generating the ASK signal.

6. The method according to claim 1, wherein the pseudo-random signal comprises at least one of:
a Zadoff-Chu (ZC) sequence,
a binary phase shift keying (BPSK) signal sequence,
a π/2-BPSK signal sequence,
a gold sequence, or
an m-sequence.

7. An apparatus, comprising:
a transceiver; and
a processor coupled to the transceiver;
wherein the processor is configured to:
generate a data signal based on data;
scramble the data signal with a pseudo-random signal to thereby generate a scrambled data signal; and
generate an amplitude shift keying (ASK) signal based on the scrambled data signal, wherein the processor configured to generate the ASK signal based on the scrambled data signal comprises:
perform a time-frequency transformation on the scrambled data signal to thereby generate a frequency domain signal;
filter the frequency domain signal to thereby generate a filtered frequency domain signal;
map the filtered frequency domain signal to a carrier signal;
perform a frequency-time transformation on the carrier signal to thereby generate a frequency-time transformed carrier signal; and
filter the frequency-time transformed carrier signal thereby generating the ASK signal; and
the transceiver is configured to:
transmit the ASK signal.

8. The apparatus according to claim 7, wherein the processor configured to generate the data signal based on the data comprises:
repeat the data to thereby generate the data signal.

9. The apparatus according to claim 7, wherein the processor configured to scramble the data signal with the pseudo-random signal to thereby generate the scrambled data signal comprises:
perform an exclusive OR operation on the pseudo-random signal and the data signal.

10. The apparatus according to claim 7, wherein the processor configured to scramble the data signal with the pseudo-random signal to thereby generate the scrambled data signal comprises:
perform a multiplication operation on the pseudo-random signal and the data signal.

11. The apparatus according to claim 7, wherein the processor configured to generate the ASK signal based on the scrambled data signal comprises:
filter the scrambled data signal to thereby generate the ASK signal.

12. The apparatus according to claim 7, wherein the pseudo-random signal comprises at least one of:
a Zadoff-Chu (ZC) sequence,
a binary phase shift keying (BPSK) signal sequence,
a π/2-BPSK signal sequence,
a gold sequence, or
an m-sequence.

13. A non-transitory computer readable medium, wherein the non-transitory computer readable medium is configured to store non-transitory instructions, and in response to being executed by a computer, the non-transitory instructions cause the computer to:
generate a data signal based on data;
scramble the data signal with a pseudo-random signal to thereby generate a scrambled data signal;
generate an amplitude shift keying (ASK) signal based on the scrambled data signal; and
transmit the ASK signal, wherein the non-transitory instructions that cause the computer to generate the ASK signal based on the scrambled data signal comprises:

perform a time-frequency transformation on the scrambled data signal to thereby generate a frequency domain signal;

filter the frequency domain signal to thereby generate a filtered frequency domain signal;

map the filtered frequency domain signal to a carrier signal;

perform a frequency-time transformation on the carrier signal to thereby generate a frequency-time transformed carrier signal; and filter the frequency-time transformed carrier signal to thereby generate the ASK signal.

14. The non-transitory computer readable medium according to claim 13, wherein the non-transitory instructions that cause the computer to generate the data signal based on the data comprises:

repeat the data to thereby generate the data signal.

15. The non-transitory computer readable medium according to claim 13, wherein the non-transitory instructions that cause the computer to scramble the data signal with the pseudo-random signal to thereby generate the scrambled data signal comprises:

perform an exclusive OR operation on the pseudo-random signal and the data signal.

16. The non-transitory computer readable medium according to claim 13, wherein the non-transitory instructions that cause the computer to generate the ASK signal based on the scrambled data signal comprises:

filter the scrambled data signal to thereby generate the ASK signal.

17. The non-transitory computer readable medium according to claim 13, wherein the pseudo-random signal comprises at least one of:

a Zadoff-Chu (ZC) sequence, a binary phase shift keying (BPSK) signal sequence, a $\pi/2$-BPSK signal sequence, a gold sequence, or an m-sequence.

* * * * *